(12) United States Patent
Schumacher

(10) Patent No.: US 12,443,563 B2
(45) Date of Patent: Oct. 14, 2025

(54) SYSTEM AND METHOD OF BLOCKCHAIN COMPRESSION

(71) Applicant: T-Mobile Innovations LLC, Overland Park, KS (US)

(72) Inventor: Greg Schumacher, Holliston, MA (US)

(73) Assignee: T-Mobile Innovations LLC, Overland Park, KS (US)

( * ) Notice: Subject to any disclaimer, the term of this patent is extended or adjusted under 35 U.S.C. 154(b) by 320 days.

(21) Appl. No.: 17/848,368

(22) Filed: Jun. 23, 2022

(65) Prior Publication Data

US 2023/0418788 A1 Dec. 28, 2023

(51) Int. Cl.
*G06F 16/174* (2019.01)
(52) U.S. Cl.
CPC ................ *G06F 16/1744* (2019.01)
(58) Field of Classification Search
CPC .................................................. G06F 16/1744
See application file for complete search history.

(56) References Cited

U.S. PATENT DOCUMENTS

| | | | | |
|---|---|---|---|---|
| 10,860,259 B1 * | 12/2020 | Winarski | ............... | G06F 12/121 |
| 10,942,852 B1 * | 3/2021 | Tian | ............... | G06F 12/0868 |
| 2019/0146946 A1 * | 5/2019 | Zhang | ............... | G06F 16/113 |
| | | | | 707/667 |
| 2019/0279172 A1 * | 9/2019 | Duffield | ............... | H04L 9/3239 |
| 2020/0051069 A1 * | 2/2020 | Wilson | ............... | G06F 16/1834 |
| 2020/0143267 A1 * | 5/2020 | Gidney | ............... | H04L 9/3239 |
| 2022/0027472 A1 * | 1/2022 | Golden | ............... | G06F 21/78 |
| 2022/0191005 A1 * | 6/2022 | D'Amore | ............... | H04L 9/0643 |

OTHER PUBLICATIONS

Politou et al. Blockchain Mutability: Challenges and Proposed Solutions, https://arxiv.org/pdf/1907.07099, Jul. 16, 2019. (Year: 2019).*
Crosby et al., "BlockChain Technology: Beyond Bitcoin," Sutardja Center for Entrepreneurship & Technology Technical Report, Oct. 16, 2015, 35 pages (Year: 2016).*

* cited by examiner

*Primary Examiner* — Matthew J Ellis

(57) ABSTRACT

A system for compressing a blockchain. The system comprises a processor; a non-transitory memory; an inactive block evaluator function stored in the non-transitory memory that, when executed by the processor, traverses a first blockchain stored in the non-transitory memory to identify inactive blocks on the first blockchain; a threshold evaluator function stored in the non-transitory memory that, when executed by the processor, evaluates whether a percentage of inactive blocks on the first blockchain exceeds a predefined threshold; and a compression function stored in the non-transitory memory that, when triggered by the threshold evaluator and executed by the processor, builds a second blockchain that comprises blocks built to contain a data content of each of the active blocks in the first blockchain and none of a data content of the inactive blocks in the first blockchain.

19 Claims, 6 Drawing Sheets

SYSTEM AND METHOD OF BLOCKCHAIN COMPRESSION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Blockchain storage of data is becoming popular and widespread. A blockchain may be considered to be an ever-growing, secure, shared record keeping system in which multiple users hold a copy of these records, and which can only be updated if consensus is reached among voting authorities. Alternatively, a blockchain can be considered a peer-to-peer, distributed ledger, that supports only consensual append operations and is deemed to be immutable. A blockchain comprises a sequence of blocks that store a variety of information including a hash of the previous block, a nonce that satisfies a criterium relative to a hash of its own block, data content, and a hash over the other parts of the block (e.g., the hash of the previous block, the nonce, and the data content). The data content can be anything. Historically, the data content in a block has been one or more transactions that are bundled together. A transaction can be defined as a record of some event. But the nature of the data content of blocks in a blockchain need not be restricted to being a record of one or more events and may simply be data.

SUMMARY

In an embodiment, a method of compressing a blockchain stored in a memory of a computer system is disclosed. The method comprises traversing a first blockchain by a compression application executing on a computer to identify active blocks and inactive blocks in the first blockchain and after traversing the first blockchain, determining a percentage of inactive blocks on the first blockchain by the compression application. The method further comprises, when the percentage of inactive blocks exceeds a predefined threshold, determining by the compression application to build a second blockchain comprising the data content of the active blocks in the first blockchain; and building the second blockchain by the compression application that comprises blocks built to contain the data content of each of the active blocks in the first blockchain and none of a data content of the inactive blocks in the first blockchain.

In another embodiment, a method of compressing a blockchain stored in a memory of a computer system is disclosed. The method comprises traversing a first blockchain by a compression application executing on a computer to identify active blocks and inactive blocks in the first blockchain and, after traversing the first blockchain, determining a percentage of inactive blocks on the first blockchain by the compression application. The method further comprises, when the percentage of inactive blocks on the first blockchain exceeds a predefined threshold, determining by the compression application to build a second blockchain comprising the data content of the active blocks in the first blockchain, building the second blockchain by the compression application that comprises blocks build to contain the data content of each of the active blocks in the second blockchain and none of the data content of the inactive blocks in the first blockchain, building blocks comprising the data content of the inactive blocks from the first blockchain by the compression application, and adding the blocks comprising the data content of the inactive blocks from the first blockchain by the compression application to a history blockchain.

In yet another embodiment, a system for compressing a blockchain is disclosed. The system comprises a processor, a non-transitory memory and an inactive block evaluator function stored in the non-transitory memory that, when executed by the processor, traverses a first blockchain stored in the non-transitory memory to identify inactive blocks on the first blockchain and to identify inactive blocks on the first blockchain that are linked to active blocks. The system further comprises a threshold evaluator function stored in the non-transitory memory that, when executed by the processor, evaluates whether a percentage of inactive blocks on the first blockchain, excepting inactive blocks that are linked to active blocks, exceeds a predefined threshold and a compression function stored in the non-transitory memory that, when triggered by the threshold evaluator and executed by the processor, builds a second blockchain that comprises blocks built to contain a data content of each of the active blocks in the first blockchain and none of a data content of the inactive blocks in the first blockchain.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
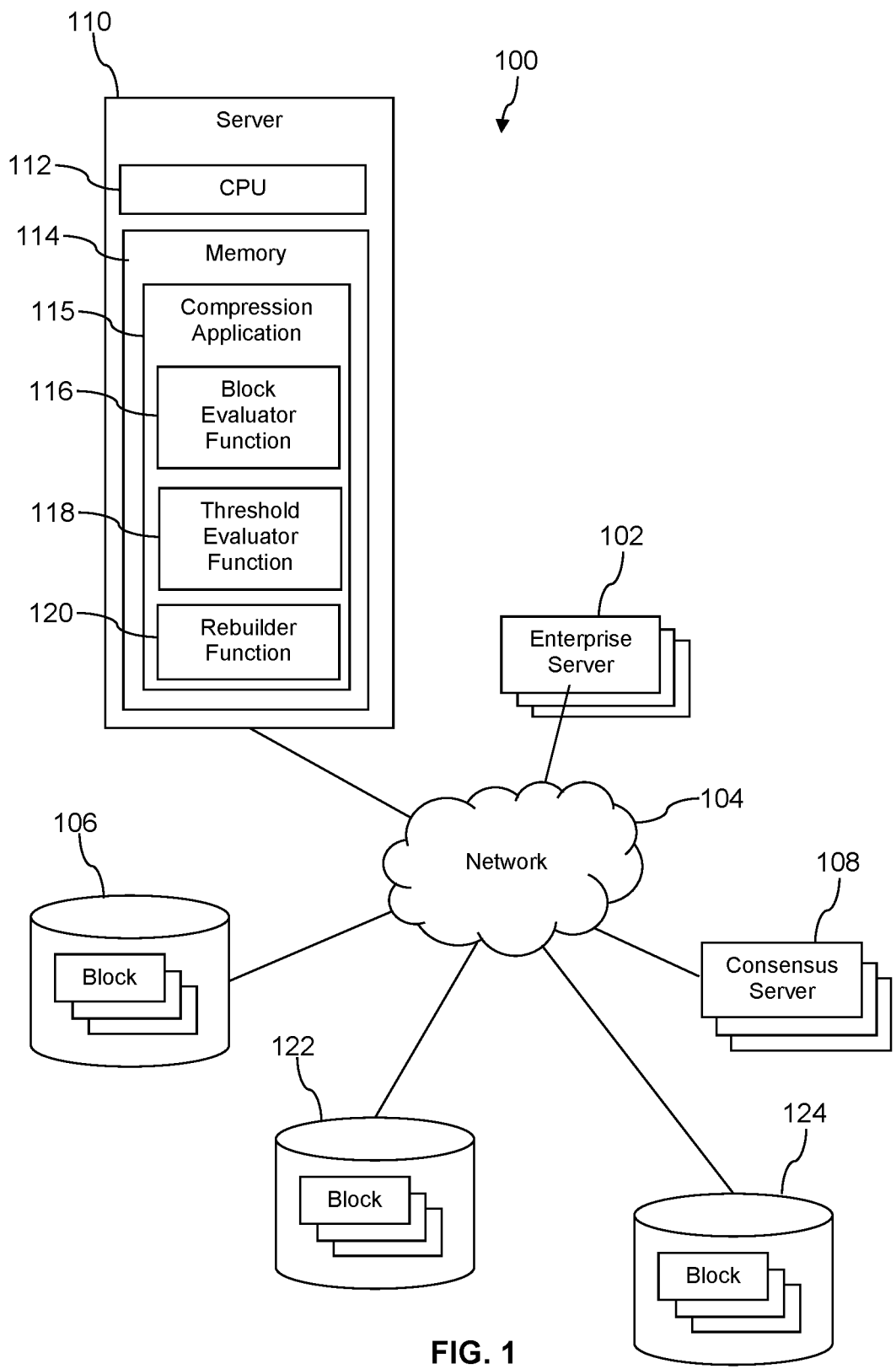
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Conventionally, a blockchain or distributed ledger is extended and never curtailed. Consequently, these data structures can grow to an unmanageable size, or at least may grow to a size that entails undesirable processing burdens and memory consumption. The present disclosure teaches a system and methods of what may be referred to as blockchain compression. For some blockchain implementations, not all blocks in the blockchain or distributed ledger remain active or of interest. For example, blockchains that track on-going transactions may not care about transactions that have been completed, such as a phone call or a data communication session. For example, a blockchain that tracks wireless communication subscriber data may not care about transactions of subscribers who have terminated their subscription account. The present disclosure proposes to take an original block chain, traverse its blocks identifying active blocks and inactive blocks, and constructing a new blockchain consisting only of new blocks that contain the transactions information and/or data content of the active blocks in the original blockchain. This new blockchain contains all the transactions information and/or data content of the active blocks and none of the transactions information and/or data content of the inactive blocks, thereby reducing processing burdens associated with consensus and reducing memory consumption for storing the transactions information and/or data content of interest. The original blockchain can be deleted. From an abstract viewpoint, the systems that employ the blockchain to store data may view this system of blockchains—the original blockchain and the new blockchain—as a single blockchain, where they always access and interact with the newest or current blockchain. From this abstract viewpoint, the original blockchain is compressed when it is transformed into the new blockchain.

In an alternative implementation, in addition to making the new blockchain consisting only of blocks containing the transactions information and/or data content of the active blocks from the original blockchain, a history blockchain can be formed consisting only of blocks containing the transactions information and/or data content of the inactive blocks from the original blockchain. After formation of the two new blockchains (the blockchain containing only active blocks and the blockchain containing only inactive blocks), the original blockchain can be deleted. All of the transactions information and/or data content of the blocks from the original blockchain are preserved but in two separate blockchains. This alternative may not conserve memory resources, but processing can be reduced by choosing to operate only with the active blocks blockchain for most processing related to active transactions. The history blockchain can remain for various purposes such as auditing and/or SOX compliance. At a later point, the blockchain containing active blocks may itself be compressed in the manner described above, creating a third blockchain comprising blocks containing all the transactions information and/or data content of the active blocks and none of the transactions information and/or data content of the inactive blocks of the second blockchain, and the transactions information and/or data content of the inactive blocks of the second blockchain can be stored in new blocks that are then appended to the history blockchain. In an embodiment, when a blockchain is determined to have more than a threshold amount of inactive blocks, the data content of all the inactive blocks may be built into a single new block and appended to the history blockchain as a single new block. The second blockchain can then be deleted. It is contemplated that the application that provides the described blockchain compression behavior may include (1) a function to identify inactive/active blocks, (2) a function to determine that a threshold ratio of inactive blocks to total blocks has been exceeded, and (3) a function that generates the new blockchain and optionally appends to the historical blockchain, and deleting the original blockchain.

The disclosure provides a particular technical solution to the particular technical problem of blockchains expanding without limit, increasing both memory resource requirements and processing burdens. While it is appreciated that some use cases may not permit such compression regimes, in particular use cases such compression can be accepted and can support significant gains in computer system efficiency due to being able to reduce processing and memory requirements. Because blockchain is a consensus-based data structure, efficiency may be gained by keeping more consensus-seeking servers involved in providing security and immutability of the current "active" blockchain and reducing the number of consensus seeking servers involved in providing security and immutability of the historical blockchain which serves only a formal archival purpose which may be less important and valuable to an enterprise. As time passes, the current "active" blockchain remains relatively small and hence efficient to handle with a large community of consensus-seeking servers, while the progressively large and unwieldy historical blockchain is served by a relatively much smaller community of consensus-seeking servers. It is noted that some use cases tend to lend themselves well to this kind of approach. For example, some financial records naturally lend themselves to segregation into annual increments or quarterly increments.

Turning now to FIG. 1, a system 100 is described. In an embodiment, the system 100 comprises a plurality of transaction processors 102, for example enterprise server computers, that generate transactions. The transaction processors 102 are communicatively coupled to a communication network 104 and therethrough to a first blockchain 106. In an embodiment, the network 104 comprises one or more private networks, one or more public networks, or a combination thereof. In an embodiment, the transaction processors 102 write transactions to the first blockchain 106 directly and read from the blockchain 106 directly. Alternatively, in an embodiment, the transaction processors 102 write transactions and read transactions from the first blockchain 106 indirectly, through a blockchain mediation application programming interface (API). The system 100 further comprises a plurality of consensus servers 108 that are communicatively coupled to the network 104. The consensus servers 108 are involved in providing consensus relative to the first blockchain 106.

The system 100 further comprises a blockchain compression server 110 that is communicatively coupled to the network 104 that comprises a processor 112 and a memory 114 that comprises a non-transitory portion. The non-transitory portion of the memory 114 stores a blockchain compression application 115. In an embodiment, the blockchain compression application 115 comprises a block evaluator function 116, a threshold evaluator function 118, and a rebuilder function 120.

The block evaluator function 116 executes periodically or on some triggering event. The block evaluator function 116 traverses the first blockchain 106 to identify what blocks on the first blockchain 106 are deemed active blocks and to identify what blocks on the first blockchain 106 are deemed inactive blocks. The distinction between active and inactive blocks may vary between different use cases. In one use case, a block may be deemed inactive if it is associated with a former subscriber of a communication service provider company (e.g., a subscriber who left a first carrier and switched service to a second carrier). In another use case, a block may be deemed inactive if it is associated with a former employee of a company who no longer works for the company. In some use cases, a block that is otherwise deemed inactive may remain active if it is linked in some way with another block that is deemed active.

In an embodiment, the block evaluator function 116 may traverse the first blockchain 106 from a genesis block of the first blockchain 106 sequentially to the last block of the first blockchain 106 (e.g., in forwards order). In another embodiment, the block evaluator function 116 may traverse the first blockchain 106 from the last block sequentially to the genesis block (e.g., in reverse order). The block evaluator function 116 generates a count and/or a list of inactive blocks that may be used by the threshold evaluator function 118 and/or by the rebuilder function 120.

In an embodiment, the threshold evaluator function 118 compares the number of inactive blocks on the first blockchain 106 to the total number of blocks on the first blockchain 106. When the percentage of the total number of blocks on the first block chain 106 that are inactive blocks exceeds a predefined threshold, the threshold evaluator function 118 triggers execution of the rebuilder function 120. In an embodiment, the predefined threshold is in the range of 10 percent to 20 percent, in the range of 20 percent to 30 percent, in the range of 30 percent to 40 percent, or in the range of 40 percent to 50 percent. Alternatively, in an embodiment, the threshold evaluator function 118 compares the number of inactive blocks on the first block chain 106 to the number of active blocks on the first blockchain 106. When the ratio of the number of inactive blocks on the first blockchain 106 to the number of active blocks on the first blockchain 106 exceeds a predefined threshold, the threshold evaluator function 118 triggers execution of the rebuilder function 120.

In an embodiment, rather than comparing numbers of inactive blocks to total number of blocks or to number of active blocks, the threshold evaluator function 118 compares data volume of inactive blocks to total data volume of inactive blocks and active blocks or compares data volume of inactive blocks to data volume of active blocks and evaluates if the proportion of data in inactive blocks exceeds a predefined threshold. All these approaches to evaluating the proportion of inactive blocks in a blockchain can be said to be determining if the inactive blocks on the blockchain exceeds a threshold.

The rebuilder function 120 reads active blocks on the first blockchain 106, builds a new block for each active block on the first blockchain 106, and adds the new block to a second blockchain 122. It is understood that an active block in the first blockchain 106 whose transaction and/or data content is included in a new block will be different from this corresponding new block in the second blockchain 122, at least because the hash value of the previous block in the new block of the second blockchain 122, the nonce of the new block, and the hash of the new block itself will be different from the corresponding hash values and nonce of the active block as it is stored in the first blockchain 106. In an embodiment, the consensus servers 108 are engaged in consensus making for each new block that the rebuilder function 120 adds to the second blockchain 122. In another embodiment, the consensus servers 108 are not engaged in consensus making while the rebuilder function 120 is initially building the second blockchain 122 but only at the end when the rebuilder function 120 has completely traversed the first blockchain 106. In either embodiment, the end result is a second blockchain 122 that contains all of the transactions information and/or data content of the active blocks in the first blockchain 106 and none of the transactions information and/or data content of the inactive blocks on the first blockchain 106. The second blockchain 122 may be referred to as a compressed blockchain as it is shorter than the first blockchain 106.

Advantages may be gained by the transaction processors 102 that wish to read only active blocks from the first blockchain 106 by reading, instead, from the second blockchain 122. Said in other words, the transaction processors 102 may be able to search and find transactions and/or data content related to active blocks by accessing the second blockchain 122 faster than by accessing the first blockchain, because they will not have to traverse the inactive blocks of the first blockchain 106. In an embodiment, the first blockchain 106 may be deleted after the second blockchain 122 is built and consensus provided by the consensus servers 108, thereby deleting the inactive blocks. In an embodiment, the rebuilder function 120 may build a history blockchain 124 whose blocks contain the transactions and/or data of the inactive blocks of the first blockchain 106.

Figure 2A:
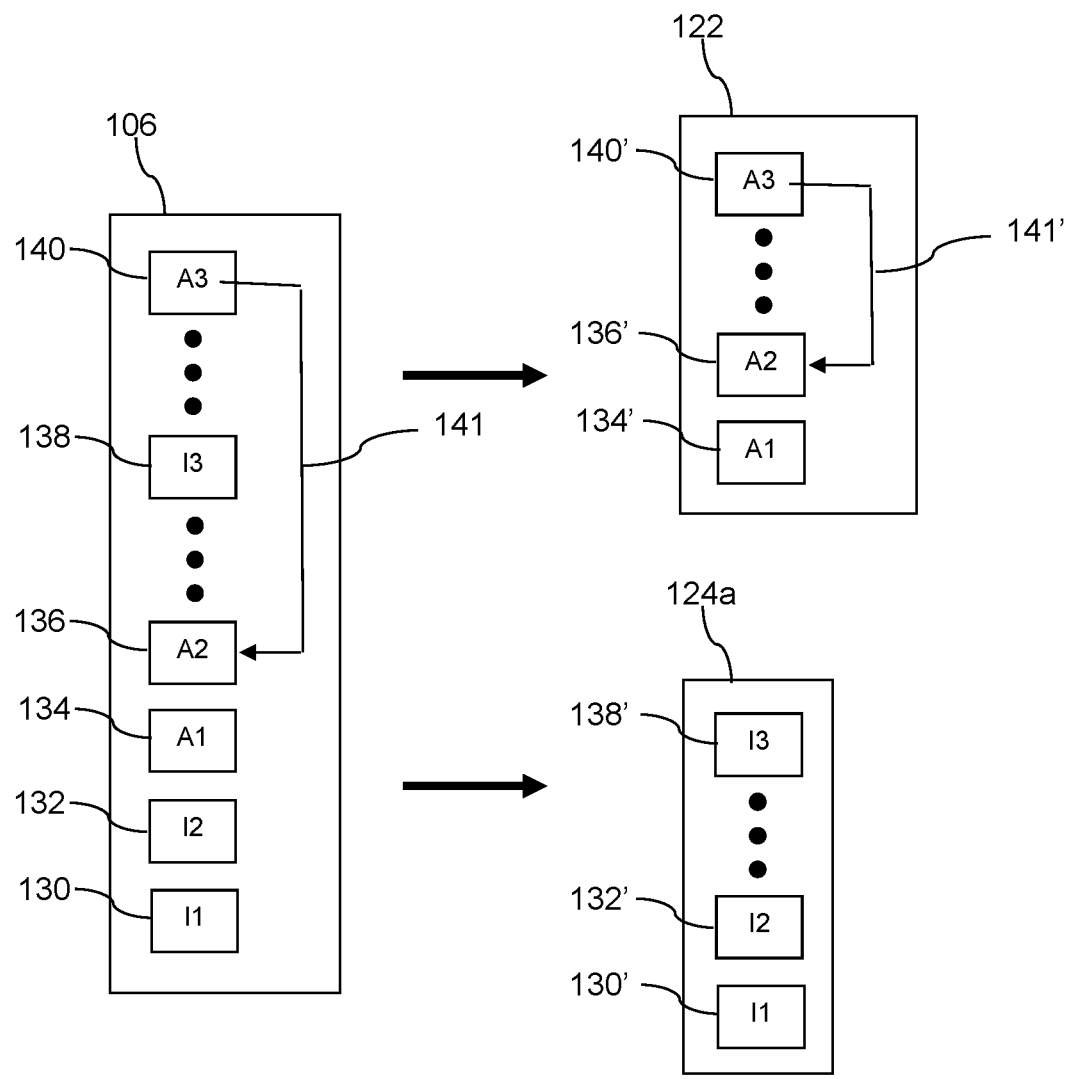
FIG. 2A, FIG. 2B, and FIG. 2C are illustrations of evolution of a blockchain data structure according to an embodiment of the disclosure.
Figure 2B:
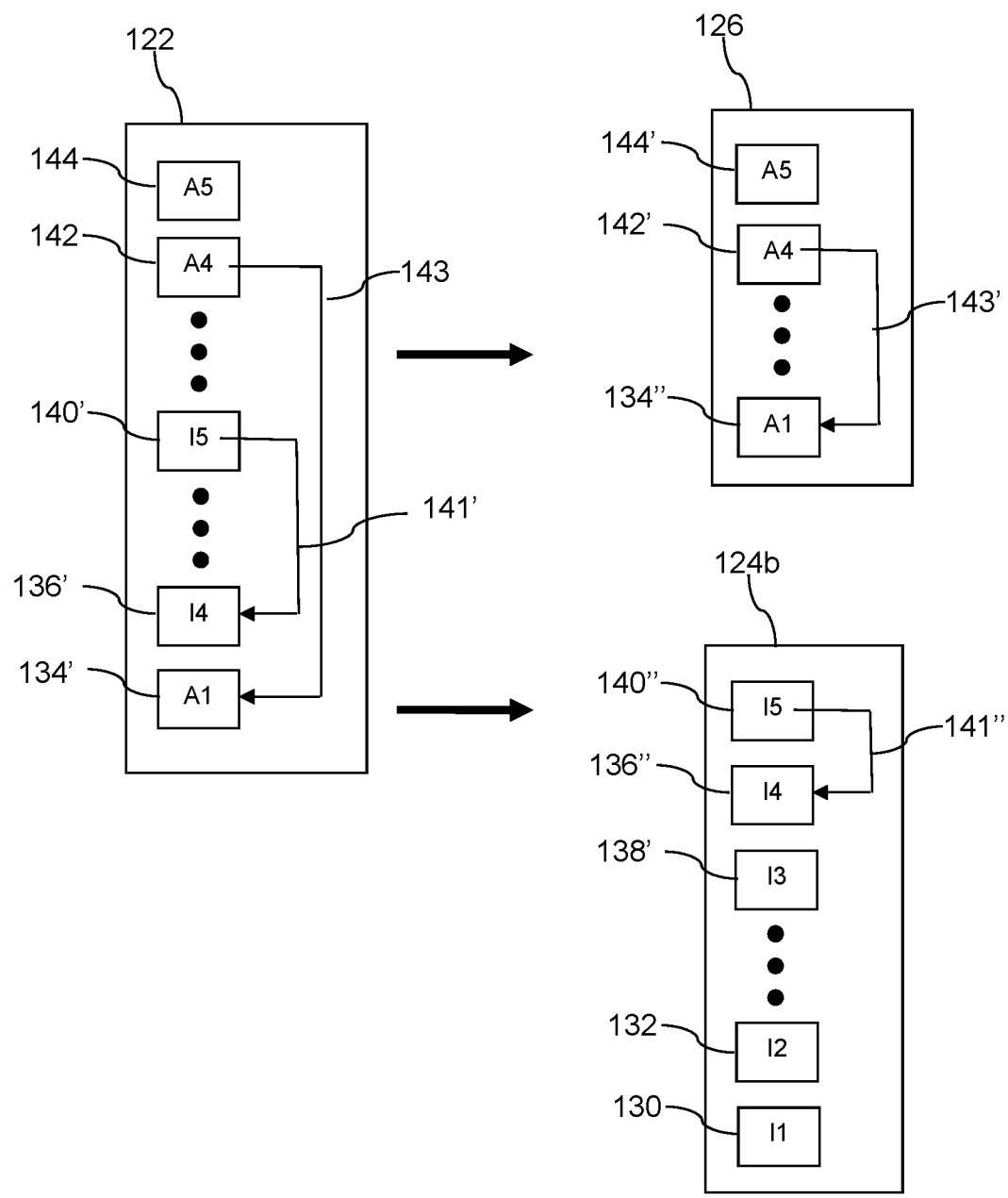
Figure 2C:
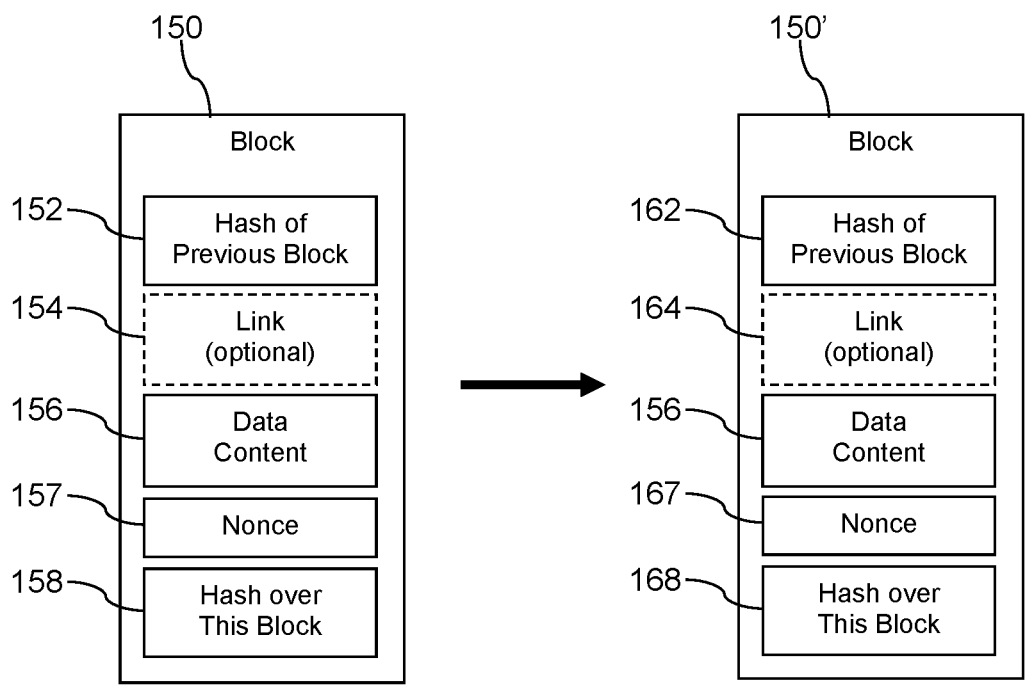

Turning now to FIG. 2A, FIG. 2B, and FIG. 2C, evolution of the blockchains 106, 122, and 124 are described. It is expected that the process described above will repeat from time to time, as the number of inactive blocks on the compressed blockchain increases beyond a threshold. This leads from the first blockchain 106 to the second blockchain 122, from the second blockchain 122 to a third blockchain 126, and from the third blockchain 126 to other subsequent blockchains. The blockchains 106, 122, 126 that contained active blocks may be referred to as an active blockchain, as it is only to the active blockchain that new blocks containing new transactions information and/or data provided by the transaction processors 102 are added. The transaction servers 102 may retain a pointer to the currently active blockchain such that reads and writes to the active blockchain is directed to the current compressed blockchain.

As seen in FIG. 2A, the first blockchain 106 may comprise a first inactive block 130, a second inactive block 132, and a third inactive block 138. The first blockchain 106 may also comprise a first active block 134, a second active block 136, and a third active block 140. It is understood that the first blockchain 106 may comprise any number of active blocks and inactive blocks. Some of the blocks in the first blockchain 106 may comprise links to an earlier block, for example when the block contains a change of information relative to the linked earlier block. For example, a marital status of an employee or communication service subscriber may change. For example, a home address of an employee or communication service subscriber may change. In FIG. 2A, third active block 140 is illustrated as linked 141 to second active block 136. In this case, a link data field may be present in the third active block 140 that points to or otherwise identifies the second active block 136.

When the rebuilder function 120 executes, it may create the second blockchain 122 that comprises active blocks 134', 136', 140' that are based on the corresponding blocks 134, 136, 140 in the first blockchain 106 (e.g., comprise the same transactions information and/or data content stored in the corresponding blocks). It is understood, however, that the hashes and the nonces in the active blocks 134', 136', 140' in the second blockchain 122 will be different from the hashes and nonces in the corresponding blocks 134, 136, 140 in the first blockchain 106. Additionally, links referring to other active blocks in the second blockchain 122 will be changed, for example the third active block 140' is illustrated as linked 141' to first active block 134'.

In an embodiment, the rebuilder function 120 creates the history blockchain 124a out of inactive blocks 130, 132, 138 from the first blockchain 106. Again, it is understood that the transactions information and/or data content of the inactive blocks 130, 132, 138 in the first blockchain 106 are copied into the corresponding inactive blocks 130', 132', 138' in the history blockchain 124a but that the hashes and nonces in the inactive blocks 130', 132', 138' will be different will be different from the hashes and nonces in the corresponding inactive blocks 130, 132, 138 in the first blockchain. 106. After building the second blockchain 122 and the history blockchain 124a, the rebuilder function 120 may delete the first blockchain 106.

While initially the second blockchain 122 comprises only active blocks created based on active blocks in the first blockchain 106, in time, new blocks are added to the second blockchain 122 by the transaction servers 108, as seen in FIG. 2B. Additionally, over time, some of the blocks on the second blockchain 122 become inactive. When the number of inactive blocks on the second blockchain 122 exceeds a predefined threshold, the process of compressing the second blockchain 122 to form a third blockchain 126 is performed by the rebuilder function 120.

At this later point in time, the first active block 134' remains active, the second active block 136' has become a fourth inactive block 136', and the third active block 140' has become a fifth inactive block 140'. A fourth active block 142 and a fifth active block 144 have been added to the second blockchain 122. The fourth active block 142 is illustrated as linked 143 to the first active block 134'. In this case, a link data field may be present in the fourth active block that points to or otherwise identifies the first active block 134'.

The rebuilder function 120 builds a new first active block 134" containing the transactions information and/or data content of the first active block 134' on the second blockchain 122, a new fourth active block 142' containing the transactions information and/or data content of the fourth active block 142 on the second blockchain 122, and a new fifth active block 144' containing the transactions information and/or data of the fifth active block 144 on the second blockchain 122 and adds them to the third blockchain 126. It is noted that the link data field of the fourth active block 142' on the third blockchain 126 contains the updated link 143' that points to or otherwise identifies the first active block 134" as it is located in the third blockchain 126. It is understood that the hashes contained in the blocks 134, 142, 144 on the third blockchain 126 are different from the hashes they contained as blocks in the second blockchain 122. The rebuilder function 120 may then add the fourth inactive block 136" and the fifth inactive block 140" to the history blockchain 124b. The history blockchain is labeled 124a in FIGS. 2A and 124b in FIG. 2B to indicate that the contents of the history blockchain 124 has changed.

Turning now to FIG. 2C, an illustrative block is described. The block 150 may be an active block or an inactive block. The block 150 comprises a hash of the previous block 152, an optional link data filed 154 that contains a link to or otherwise references another block on the blockchain in which block 150 is located, a transactions information and/or data content field 156, a nonce 157, and a hash over the other components 152, 154, 156, 157 of the block 150. When the transactions information and/or data content 156 is migrated from one blockchain to another blockchain to be block 150' the transactions information and/or data content field 156 remains unchanged, but the hash of the previous block changes as indicated by the new label 162, the optional link changes as indicated by the new label 164, the nonce changes as indicated by the new label 167, and the hash over the components 162, 164, 156, 167 changes as indicated by the new label 168. This change of block 150 to block 150' is exemplary of all the blocks that are migrated from one blockchain to another blockchain as described herein. The transactions information and/or data content remains unchanged, but the other components of the block adapt to be suitable for the migrated block as situated in the other blockchain. It is pointed out that from the point of view of using the blocks in the blockchains, it is primarily the transactions information and/or data content that is of interest to end users; the other components of the blocks are, in a sense, structural and/or architectural details that are needed to make the blockchains work appropriately but which are irrelevant to the ultimate purpose of the users who interact with the blockchains.

With reference again to FIG. 1 as well as to FIG. 2A and FIG. 2B, it is understood that the transaction servers 102, the consensus servers 108, and the blockchain compression server 110 may be communicatively coupled to the succession of active blockchains 106, 122, 126, etc., as well as to the history blockchain 124. As stated above, in an embodiment, the transaction servers 102 may have indirect access to the active blockchains via a blockchain mediation API.

In an embodiment, when new blocks are generated to contain new transactions information and/or data content by the transactions servers 102 during a blockchain compression process, the new blocks may be added to the end of the currently active blockchain, in which case they are naturally copied over to the new blockchain of active blocks being constructed by the rebuilder function 120. In another embodiment, the transactions information and/or data content that would otherwise be provided in new blocks may be cached or queued during the blockchain compression process and then allowed to be added to the new active blockchain in a normal way after the new blockchain has been designated as the active blockchain.

Figure 3:
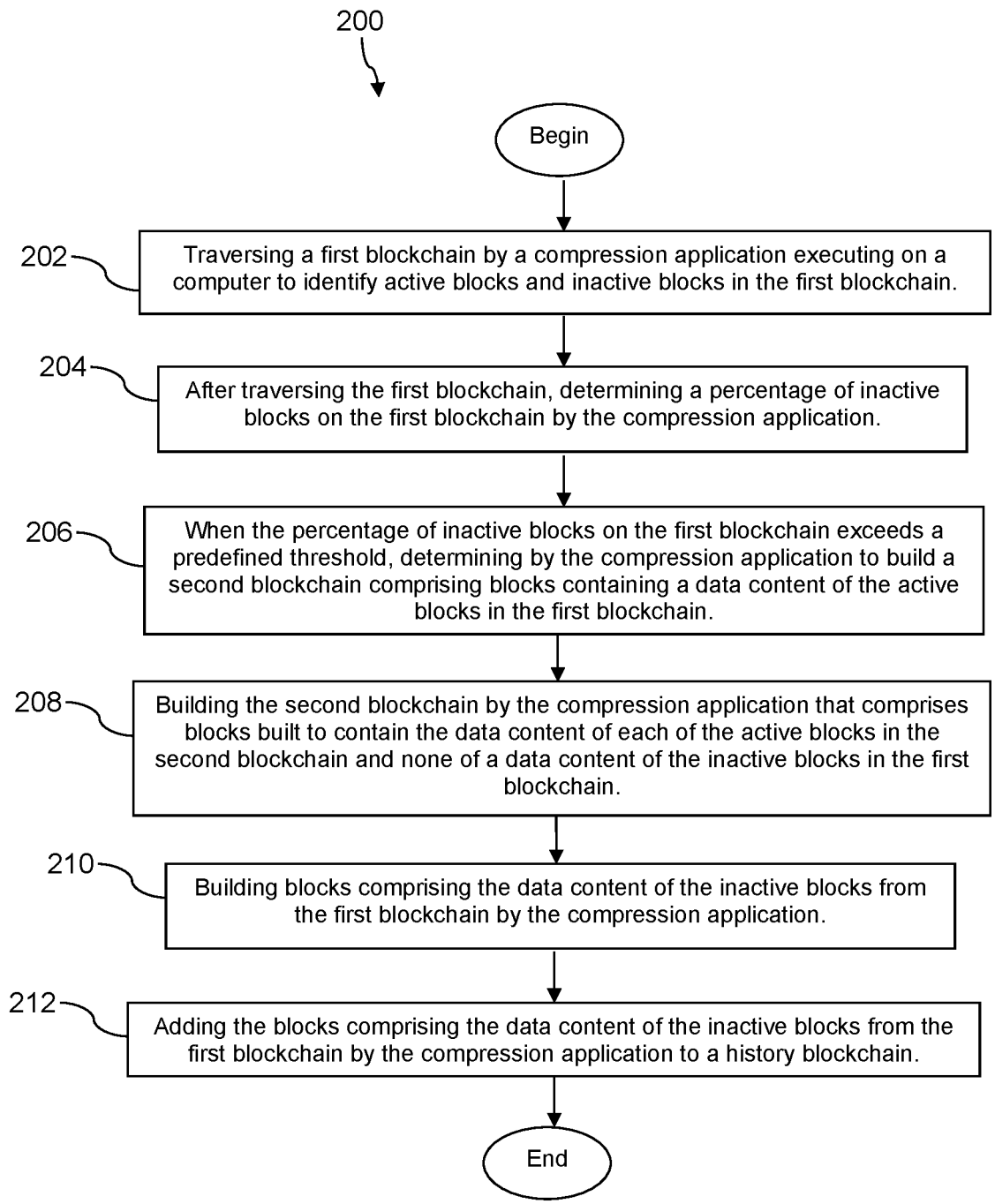
FIG. 3 is a flowchart of a method according to an embodiment of the disclosure.

Turning now to FIG. 3, a method 200 is described. In an embodiment, the method 200 is a method of compressing a blockchain stored in a memory of a computer system. At block 202, the method 200 comprises traversing a first blockchain by a compression application executing on a computer to identify active blocks and inactive blocks in the first blockchain. In an embodiment, the compression application comprises a block evaluator function that traverses the first blockchain to identify active blocks and inactive blocks. In an embodiment, the compression application and/or the block evaluator function traverses the first blockchain periodically. In an embodiment, the compression application and/or the block evaluator function traverses the first blockchain in reverse order from a last block to a genesis block. In an embodiment, the compression application traverses the first blockchain in forwards order from a genesis block to a last block. In an embodiment, identifying active blocks and inactive blocks in the first blockchain comprises checking blocks for links to an active block on the first blockchain comprises checking blocks for links to an active block before deeming a block inactive. In an embodiment, a block on the first blockchain may be deemed inactive when it refers to a former employee of a company or to a former subscriber of a communication service provider.

At block 204, the method 200 comprises, after traversing the first blockchain, determining a percentage of inactive blocks on the first blockchain by the compression application. In an embodiment, the compression application comprises a threshold evaluator function that determines when the percentage of inactive blocks exceeds the predefined threshold and triggers the building of the second blockchain.

At block 206, the method 200 comprises, when the percentage of inactive blocks on the first blockchain exceeds a predefined threshold, determining by the compression application to build a second blockchain comprising blocks containing a data content of the active blocks in the first blockchain. In an embodiment, the predefined threshold is between 10 percent and 20 percent, between 20 percent and 30 percent, between 30 percent and 40 percent, or between 40 percent and 50 percent.

At block 208, the method 200 comprises building the second blockchain by the compression application that comprises blocks built to contain the data content of each of the active blocks in the first blockchain and none of a data content of the inactive blocks in the first blockchain. In an embodiment, the compression application comprises a rebuilder function that builds the second blockchain that comprises all the active blocks in the first blockchain and none of the inactive blocks in the first blockchain.

In an embodiment, at block 210, the method 200 comprises building blocks comprising the data content of the inactive blocks from the first blockchain by the compression application. In and embodiment, at block 212, the method 200 comprises adding the blocks comprising the data content of the inactive blocks from the first blockchain by the compression application to a history blockchain. In an embodiment, the compression application comprises a rebuilder function that performs the processing of blocks 210 and 212. In an embodiment, building the second blockchain involves achieving consensus among a first plurality of consensus servers and adding the inactive blocks to the history blockchain involves achieving consensus among a second plurality of consensus servers. In an embodiment, the first plurality of consensus servers is more numerous than the second plurality of consensus servers.

In an embodiment, the method 200 further comprises traversing the second blockchain by the compression application to identify active blocks and inactive blocks in the second blockchain; after traversing the second blockchain, determining a percentage of inactive blocks on the second blockchain by the compression application; when the percentage of inactive blocks on the second blockchain exceeds the predefined threshold, determining by the compression application to build a third blockchain comprising the data content of the active blocks in the second blockchain; and building the third blockchain by the compression application that comprises blocks built to contain the data content of each of the active blocks in the second blockchain and none of the data content of the inactive blocks in the second blockchain.

Figure 4:
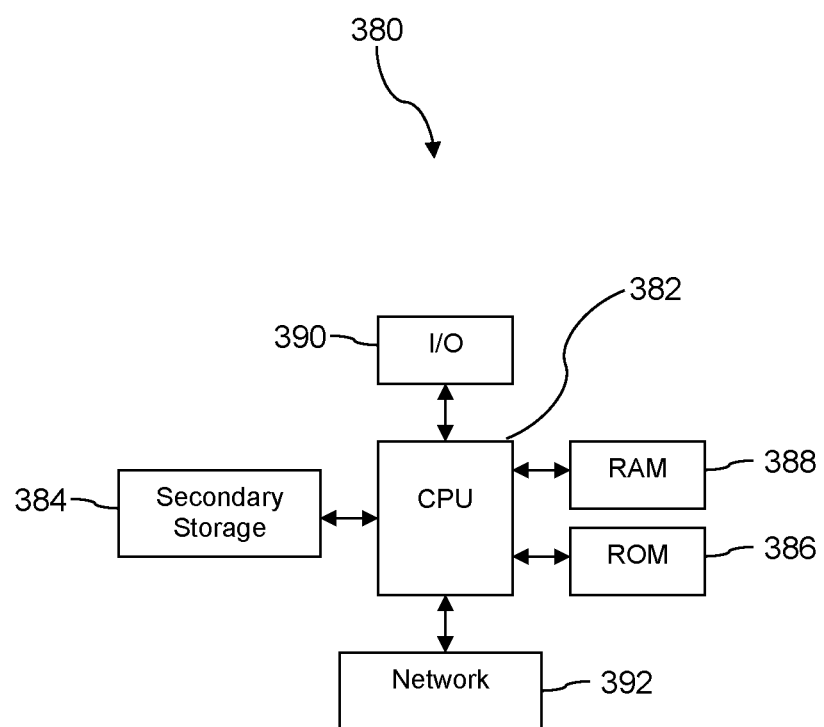
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of compressing a blockchain stored in a memory of a computer system, comprising:
    accessing a first blockchain by a compression application executing on a computer, the first blockchain comprising active and inactive blocks;
    traversing the first blockchain by the compression application to identify the active blocks and the inactive blocks in the first blockchain, wherein the blocks of the first blockchain include wireless communication subscriber data;
    identifying a first block of the first blockchain as an inactive block according to a block evaluator function and determining to treat the first block as an active block despite the identification as an inactive block responsive to the first block having a link with a second block of the first blockchain, the second block identified as an active block by the block evaluator function;
    after traversing the first blockchain, determining that a percentage of inactive blocks on the first blockchain by the compression application exceeds a predefined threshold;
    responsive to the percentage of inactive blocks in the first blockchain exceeding the predefined threshold, determining by the compression application to build a second blockchain comprising blocks containing a data content of the active blocks in the first blockchain;
    building the second blockchain by the compression application that comprises blocks built to contain the data content of each of the active blocks in the first blockchain and none of a data content of the inactive blocks in the first blockchain;
    constructing a history blockchain by:
        building new blocks for the history blockchain on the basis of, and including the data content of, the inactive blocks; and
        adding the new blocks to the history blockchain, wherein the first blockchain, the second blockchain, and the history blockchain are each separate and distinct blockchains.

2. The method of claim 1, wherein the predefined threshold is between 20 percent and 30 percent.

3. The method of claim 1, wherein the predefined threshold is between 30 percent and 40 percent.

4. The method of claim 1, wherein the predefined threshold is between 10 percent and 20 percent.

5. The method of claim 1, wherein building the second blockchain involves achieving consensus among a first plurality of consensus servers and adding the inactive blocks to the history blockchain involves achieving consensus among a second plurality of consensus servers.

6. The method of claim 5, wherein the number of the first plurality of consensus servers is greater than the number of the second plurality of consensus servers.

7. The method of claim 1, further comprising traversing the second blockchain by the compression application to identify active blocks and inactive blocks in the second blockchain;
    after traversing the second blockchain, determining a percentage of inactive blocks on the second blockchain by the compression application;
    when the percentage of inactive blocks in the second blockchain exceeds a predefined threshold, determining by the compression application to build a third blockchain comprising blocks containing a data content of the active blocks in the second blockchain;
    building the third blockchain by the compression application that comprises blocks built to contain the data content of each of the active blocks in the third blockchain and none of a data content of the inactive blocks in the second blockchain;
    building blocks comprising the data content of the inactive blocks from the second blockchain; and
    adding the blocks comprising the data content of the inactive blocks from the second blockchain by the compression application to the history blockchain.

8. A system for compressing a blockchain, comprising:
    a processor;
    a non-transitory memory;
    an inactive block evaluator function stored in the non-transitory memory that, when executed by the processor;
        accesses and traverses a first blockchain stored in the non-transitory memory, the first blockchain including active and inactive blocks, to identify the inactive blocks on the first blockchain and to identify inactive blocks on the first blockchain that are linked to the active blocks, wherein the blocks of the first blockchain include wireless communication subscriber data;
        identifies a first block of the first blockchain as an inactive block according to a block evaluator function; and
        determines to treat the first block as an active block despite the identification as an inactive block responsive to the first block having a link with a second block of the first blockchain, the second block identified as an active block by the block evaluator function;

a threshold evaluator function stored in the non-transitory memory that, when executed by the processor, determines that a percentage of inactive blocks on the first blockchain, excepting the inactive blocks that are linked to the active blocks, exceeds a predefined threshold;

a compression function stored in the non-transitory memory that, when triggered by the threshold evaluator and executed by the processor, and responsive to the percentage exceeding the predefined threshold, builds a second blockchain that comprises blocks built to contain a data content of each of the active blocks in the first blockchain and none of a data content of the inactive blocks in the first blockchain; and constructing a history blockchain by:
building new blocks for the history blockchain on the basis of, and including the data content of the inactive blocks; and
adding the new blocks to the history blockchain, wherein the first blockchain, the second blockchain, and the history blockchain are each separate and distinct blockchains.

9. The system of claim 8, wherein the predefined threshold is defined in terms of a number of inactive blocks on the first blockchain compared to one of number of active blocks on the first blockchain or a total number of blocks on the first blockchain or is defined in terms of a volume of data in inactive blocks on the first blockchain compared to one of a volume of data in active blocks on the first blockchain or a total volume of data in blocks on the first blockchain.

10. The system of claim 8, wherein the block evaluator function deems a block on the first blockchain inactive when it refers to a former employee of a company.

11. The system of claim 8, wherein the block evaluator function deems a block on the first blockchain inactive when it refers to a former subscriber of a communication service provider.

12. The system of claim 8, wherein the inactive block evaluator function traverses the first blockchain in reverse order from a last block to a genesis block.

13. The system of claim 8, wherein the inactive block evaluator function traverses the first blockchain in forwards order from a genesis block to a last block.

14. A method of compressing a blockchain stored in a memory of a computer system, comprising:
accessing a first blockchain by a compression application executing on a computer, the first blockchain comprising active and inactive blocks;
traversing the first blockchain by the compression application to identify the active blocks and the inactive blocks in the first blockchain, wherein the blocks of the first blockchain include wireless communication subscriber data;
identifying a first block of the first blockchain as an inactive block according to a block evaluator function and determining to treat the first block as an active block despite the identification as an inactive block responsive to the first block having a link with a second block of the first blockchain, the second block identified as an active block by the block evaluator function;
after traversing the first blockchain, determining that a percentage of inactive blocks on the first blockchain by the compression application exceeds a predefined threshold;
responsive to the percentage of inactive blocks exceeding the predefined threshold, determining by the compression application to build a second blockchain comprising data content of the active blocks in the first blockchain;
building the second blockchain by the compression application that comprises blocks built to contain the data content of each of the active blocks in the first blockchain and none of a data content of the inactive blocks in the first blockchain; and
constructing a history blockchain by building new blocks based on and containing the data content of the inactive blocks in the first blockchain onto the history blockchain, wherein the first blockchain, the second blockchain, and the history blockchain are each separate and distinct blockchains.

15. The method of claim 14, further comprising:
traversing the second blockchain by the compression application to identify active blocks and inactive blocks in the second blockchain;
after traversing the second blockchain, determining a percentage of inactive blocks on the second blockchain by the compression application;
when the percentage of inactive blocks on the second blockchain exceeds the predefined threshold, determining by the compression application to build a third blockchain comprising the data content of the active blocks in the second blockchain; and
building the third blockchain by the compression application that comprises blocks built to contain the data content of each of the active blocks in the second blockchain and none of the data content of the inactive blocks in the second blockchain.

16. The method of claim 14, wherein the compression application traverses the first blockchain periodically.

17. The method of claim 14, wherein the compression application comprises a block evaluator function that traverses the first blockchain to identity active blocks and inactive blocks.

18. The method of claim 14, wherein the compression application comprises a threshold evaluator function that determines when the percentage of inactive blocks exceeds the predefined threshold and triggers the building of the second blockchain.

19. The method of claim 14, wherein the compression application comprises a rebuilder function that builds the second blockchain that comprises all the active blocks in the first blockchain and none of the inactive blocks in the first blockchain.

* * * * *